(No Model.)

T. R. MURDOCK.
STUMP JOINT FOR CARRIAGES.

No. 535,389. Patented Mar. 12, 1895.

Witnesses
C. A. Ford.
D. P. Mockhaupter.

Inventor
Thomas R. Murdock.
By his Attorneys,
C. A. Snow & Co.

UNITED STATES PATENT OFFICE.

THOMAS R. MURDOCK, OF AUBURN, NEW YORK.

STUMP-JOINT FOR CARRIAGES.

SPECIFICATION forming part of Letters Patent No. 535,389, dated March 12, 1895.

Application filed February 24, 1893. Renewed February 7, 1895. Serial No. 537,660. (No model.)

*To all whom it may concern:*

Be it known that I, THOMAS R. MURDOCK, a citizen of the United States, residing at Auburn, in the county of Cayuga and State of New York, have invented a new and useful Stump-Joint for Carriages, of which the following is a specification.

This invention relates to stump joints for the top props of carriages; and it has for its object to provide certain improvements in the construction of joints of this character which will render the manufacture thereof simpler and inexpensive, while at the same time providing a joint of exceptional durability and efficiency.

To this end the main and primary object of the invention is to provide an improved stump joint which prevents rattling or shaking of the top props, while at the same time being so constructed as not to depend upon its pintle or rivet for usefulness.

With these and many other objects in view, which will readily appear as the nature of the invention is better understood, the same consists in the novel construction, combination, and arrangement of parts hereinafter more fully described, illustrated, and claimed.

Figure 1:
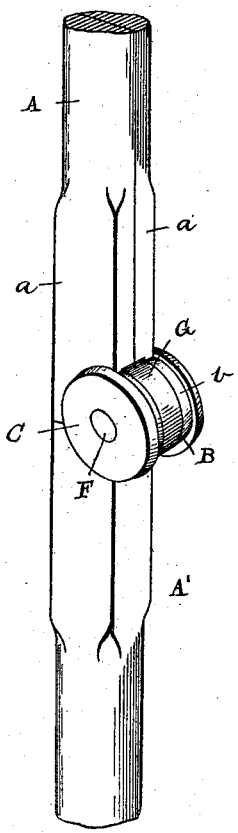
Figure 3:
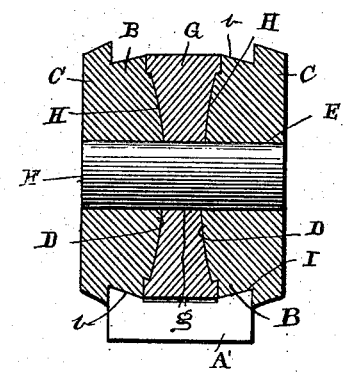
Figure 2:
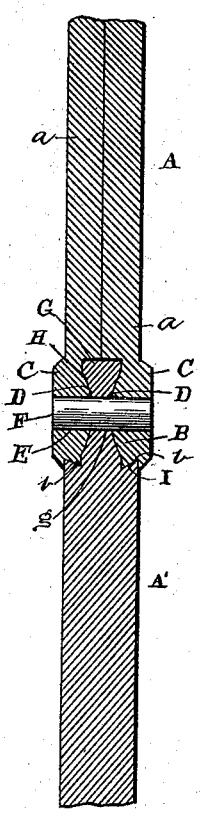
Figures 4, 6:
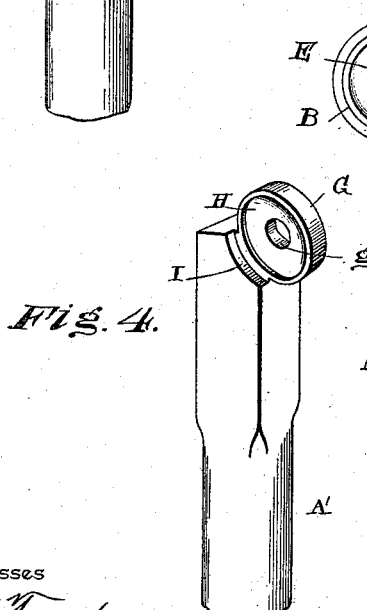
Figure 5:
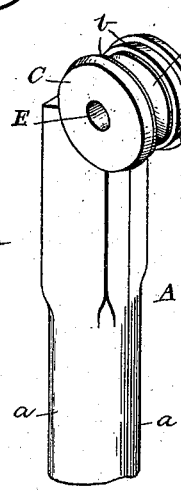

In the accompanying drawings:—Figure 1 is a perspective view of a top or stump joint for carriages constructed in accordance with this invention. Fig. 2 is a central longitudinal sectional view of the joint. Fig. 3 is an enlarged transverse sectional view of the joint. Fig. 4 is a detail in perspective of the solid joint member. Fig. 5 is an enlarged detail in perspective of the other joint member the parts of which are halved onto each other. Fig. 6 is a detail plan view of the sectional joint member, as formed before the duplicate sections are halved onto each other.

Referring to the accompanying drawings, A A', represent opposite joint members which are designed to be coupled together at their meeting ends by a knuckle joint, and at their other ends to the top prop of a carriage in the ordinary manner.

The joint member A, is preferably formed out of a blank of metal having two duplicate halves $a$, which are subsequently brazed or welded together at their meeting edges to form a substantially solid joint member having the requisite strength for the use to which the joint is applied. The said joint member A, is provided at one end thereof with the opposite duplicate circular ear flanges B, which are preferably beveled as at $b$, upon their outer edges, and which are further provided upon their outer faces with the off-standing rivet or pintle heads C. The heads C, form a part of the joint member, A, being either integral therewith or welded thereon, thus dispensing with the separate rivet or pintle heads which are liable to become loose and be forced out of the joint, so as to impair the same as is ordinarily the case, while at the same time by having the integral rivet or pintle head, the loss of the rivet or pintle does not necessitate a renewal of the heads therefor. The said circular ear flanges B, which are stamped from the member halves $a$, or cast therewith, are further provided upon their inner faces, facing each other, with the inwardly projecting convexed bearing bosses D, and said bearing bosses, the ear flanges and said rivet or pintle heads are pierced with the openings E, for the reception of the ordinary rivet or pintle F, secured in position in the ordinary manner.

The other joint member A', is formed solid in any suitable manner and is provided at one end thereof with the offstanding circular joint tongue G, provided with a rivet opening or perforation $g$, therethrough, and concaved bearing recesses H, in opposite sides thereof, which, when the joint tongue is placed between the ear flanges B, of the other joint member, are designed to receive the bearing bosses which project therein and form a connection independent of the rivet or pintles. Furthermore, since the halves $a$ of the joint member A are welded or brazed together after the flanges B have been made to embrace the joint tongue G, it will be obvious that a permanent joint is effected, none of the parts of which are separable, and which will remain unimpaired, until broken, without the use of the ordinary rivet or pintle. The said solid joint member A', is further provided, at the extremity from which the tongue projects, with the curved dove-tailed grooves I, which receive and work over the beveled ear flanges B, inside of the integral rivet or pintle heads C, which overlap the sides of the joint member A', and serve to make the joint more compact. After the two joint members have been assembled as described, the rivet or pintle F, is passed through the openings for the reception thereof, and secured in place in the ordinary manner.

Now it will be readily seen that by the construction herein described, the joint does not depend entirely upon the rivet or pintle for usefulness, because the latter only serves to strengthen and brace the joint, owing to the fact that in case the rivet or pintle works loose and drops out of position, the joint would still remain unimpaired, inasmuch as the bearing bosses on the ear flanges of one member form a pivotal connection with the bearing recesses in the opposite sides of the other joint member, the overlapping rivet heads also assisting to insure a firm connection between the joint members.

Having thus described my invention, what I claim, and desire to secure by Letters Patent, is—

1. A stump joint for carriages, comprising a solid member having a centrally-projecting joint tongue at one end provided with recesses in both of its sides, and an opposing member provided at one end with integral ear-flanges parallel with each other and adapted to embrace said joint tongue and fit in the side recesses thereof, said opposing member consisting of duplicate halves brazed or welded together at their meeting edges to permanently join the ear-flanges onto the joint tongue, substantially as set forth.

2. A stump joint for carriages comprising opposite solid members, one of which is provided at one end with separated perforated ear flanges having outer beveled edges, integral off-standing rivet or pintle heads at one side thereof and inwardly projecting convexed bearing bosses, and the other member being provided at one end with a projecting perforated joint tongue adapted to be embraced between said ear flanges and having opposite concaved bearing recesses receiving said bearing bosses, and the joint rivet or pintle passing through the aligned joint perforations, substantially as set forth.

3. A stump joint for carriages comprising opposite members, one of which is provided at one end with separated perforated beveled ear flanges having integral offstanding rivet or pintle heads at one side, and the other member being provided at one end with a projecting perforated joint tongue, and curved dovetailed grooves adapted to receive and work over the beveled ear flanges embracing said tongue, and the joint rivet or pintle, substantially as set forth.

In testimony that I claim the foregoing as my own I have hereto affixed my signature in the presence of two witnesses.

THOMAS R. MURDOCK.

Witnesses:
PETER P. CALLANAN,
GEORGE BROOKS.